Nov. 10, 1925.  1,561,380

H. L. VAN BRUNT

MUD SHOE

Filed May 3, 1924

Harry L. Van Brunt
INVENTOR

By Victor J. Evans
ATTORNEY

Patented Nov. 10, 1925.

1,561,380

UNITED STATES PATENT OFFICE.

HARRY L. VAN BRUNT, OF HURST, ILLINOIS, ASSIGNOR OF ONE-HALF TO VICTOR H. BURKHART, OF HURST, ILLINOIS.

MUD SHOE.

Application filed May 3, 1924. Serial No. 710,865.

*To all whom it may concern:*

Be it known that I, HARRY L. VAN BRUNT, a citizen of the United States, residing at Hurst, in the county of Williamson and State of Illinois, have invented new and useful Improvements in Mud Shoes, of which the following is a specification.

This invention relates to a mud shoe and has for its primary object the construction of a more substantial structure of shoe which will positively withstand the rough usage to which devices of this character are subject.

An object of the invention is the novel manner of shaping the plate and associating same with the tread of a tire and positively locking the plate in this position.

Besides the above my invention is distinguished in the simple, substantial manner of constructing and associating the various parts so that the device may be quickly attached to or detached from an automobile wheel.

With these and other objects in view the invention will be better understood from the following detailed description taken in connection with the accompanying drawing wherein.

Figure 1:
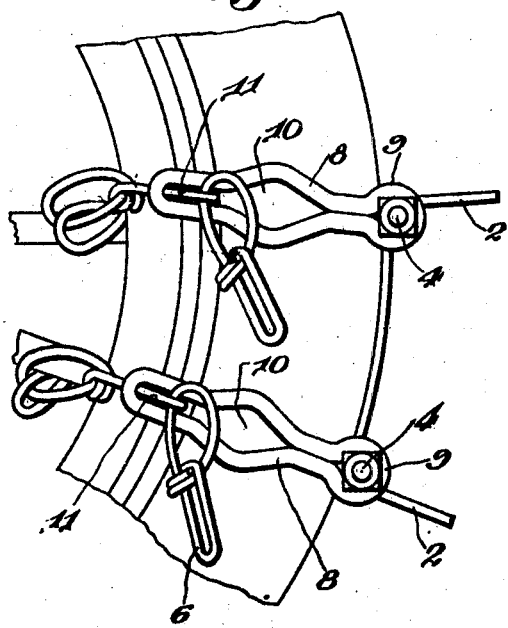
Fig. 1 is a fragmentary portion of an automobile wheel showing my improved mud shoe attached thereto.
Figure 2:
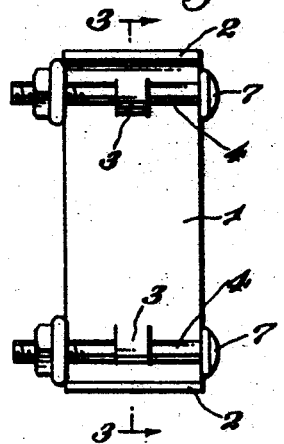
Fig. 2 is an elevation of the device.
Figure 3:
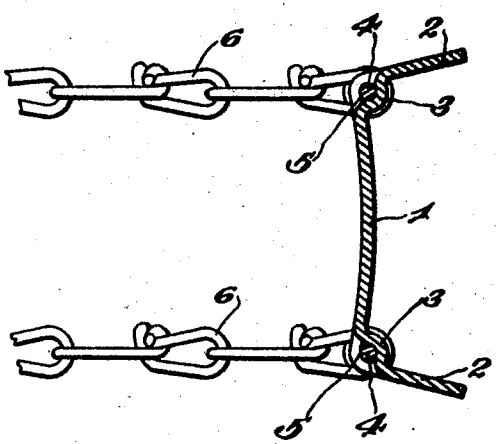
Fig. 3 is a sectional view on the line 3—3 of Fig. 2.

Again referring to the drawing illustrating one of the many constructions of my invention the numeral 1 designates a plate of a shape to conform to and lie flat against the tread of a tire. The ends of the plate are bent to form flanges 2 extending radially of the wheel. At the point of juncture of the flanges 2 with the plate 1 are stamped ears 3 for receiving therein the bolt 4. Thus it will be seen that the bolts are held in engagement at the corners 5 of the plate so as to give the greatest strength possible to this connection. Chain section 6 each have one end swingingly connected to the head portion of the bolt as indicated at 7 and they are of a length to be passed around the wheel adjacent the spokes so as to be detachably connected to the clips 8 which are also swingingly connected to the bolts. Any suitable form of clip may be used for this purpose but I have illustrated the clip consisting of a single piece bent to form an eye 9 receiving the bolt and a central opening 10 communicating with the slot 11 so that the link of the chain may be passed through the opening 10 lodged in the slot 11 to lock the parts together while at the same time allow the parts to be readily disconnected.

It is, of course, to be understood that the invention may be constructed in various other manners and the parts associated in different relations, therefor, I do not desire to be limited in any manner except as set forth in the claims hereunto appended.

Having thus described my invention what I claim is:

1. A mud shoe comprising a plate having its ends formed in radially extending flanges and further having an ear formed at the juncture of each flange with the body of the plate, a bolt mounted in each ear and means having connection with similar ends of the bolts adapted to embrace a wheel felly and swingingly connect the felly to the other ends of the bolts.

2. A mud shoe comprising a plate having its ends formed into radially extending flanges and further having ears formed at the juncture of each flange with the body of the plate, a bolt mounted in each ear, a chain section connected to the headed portion of each bolt, and a clip swingingly connected to the end of each bolt, opposite the head and having detachable connection with said chain sections.

3. A mud shoe comprising a one-piece plate, radially extending flanges at each end thereof, bolts carried by the plate, a clip loosely connected to one end of the bolts and chain lengths loosely connected at one end with the other ends of the bolts and having their other ends detachably engaged with the clips.

4. A mud shoe comprising a one piece plate curved to conform to the tread of a tire and having radially extending flanges at the ends of the plate, an ear formed at the juncture of each flange with the plate, a bolt mounted in each ear and engaging against the surface of the plate, chain sections each having one end swingingly connected to the head portion of each bolt, and clips each swingingly connected to a bolt and constructed to have detachable engagement with any one of the links of the chain sections.

In testimony whereof I affix my signature.

HARRY L. VAN BRUNT.